US010930975B2

(12) United States Patent
Park et al.

(10) Patent No.: US 10,930,975 B2
(45) Date of Patent: Feb. 23, 2021

(54) ELECTROLYTE FOR LITHIUM-SULFUR BATTERY AND LITHIUM-SULFUR BATTERY COMPRISING SAME (71) Applicant: LG CHEM, LTD., Seoul (KR)

(72) Inventors: Intae Park, Daejeon (KR); Sungwon Hong, Daejeon (KR); Charles Kiseok Song, Daejeon (KR); Youhwa Ohk, Daejeon (KR); Doo Kyung Yang, Daejeon (KR); Changhoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 125 days.

(21) Appl. No.: 16/082,484

(22) PCT Filed: Feb. 14, 2017

(86) PCT No.: PCT/KR2017/001582
§ 371 (c)(1),
(2) Date: Sep. 5, 2018

(87) PCT Pub. No.: WO2018/004103
PCT Pub. Date: Jan. 4, 2018

(65) Prior Publication Data
US 2019/0097270 A1 Mar. 28, 2019

(30) Foreign Application Priority Data
Jun. 28, 2016 (KR) .................. 10-2016-0080630
Feb. 13, 2017 (KR) .................. 10-2017-0019514

(51) Int. Cl.
H01M 10/052 (2010.01)
H01M 10/0567 (2010.01)
(Continued)

(52) U.S. Cl.
CPC ..... *H01M 10/0569* (2013.01); *H01M 10/052* (2013.01); *H01M 10/0567* (2013.01);
(Continued)

(58) Field of Classification Search
CPC .......... H01M 10/0569; H01M 10/052; H01M 10/0567; H01M 10/0568; H01M 4/38; H01M 4/382; H01M 2300/004
See application file for complete search history.

(56) References Cited

U.S. PATENT DOCUMENTS 5,776,635 A * 7/1998 Takeuchi .............. H01M 4/483
429/218.1
2002/0045101 A1 4/2002 Hwang et al.
(Continued)

FOREIGN PATENT DOCUMENTS

CN 1335652 A 2/2002
CN 1930710 A 3/2007
(Continued)

OTHER PUBLICATIONS

Nambu et al. Electrochemistry, 84 (10), 776-778 (2016). (Year: 2016).*
(Continued)

Primary Examiner — Lisa S Park
(74) Attorney, Agent, or Firm — Birch, Stewart, Kolasch & Birch, LLP (57) ABSTRACT The present invention relates to a ternary liquid electrolyte for a lithium-sulfur battery and a lithium-sulfur battery including the same.
The liquid electrolyte for a lithium-sulfur battery according to the present invention exhibits an excellent sulfur utilization rate when used in a lithium-sulfur battery, and exhibits excellent stability. Accordingly, the liquid electrolyte for a lithium-sulfur battery according to the present invention is
(Continued)

capable of enhancing a life time property while securing a capacity property of a lithium-sulfur battery.

19 Claims, 2 Drawing Sheets

(51) Int. Cl.
  *H01M 10/0568* (2010.01)
  *H01M 10/0569* (2010.01)
  *H01M 4/38* (2006.01)

(52) U.S. Cl.
  CPC .......... *H01M 10/0568* (2013.01); *H01M 4/38* (2013.01); *H01M 4/382* (2013.01); *H01M 2300/004* (2013.01)

(56) References Cited

U.S. PATENT DOCUMENTS

| | | | |
|---|---|---|---|
| 2002/0094480 A1* | 7/2002 | Gan | H01M 4/13 |
| | | | 429/212 |
| 2004/0048164 A1 | 3/2004 | Jung et al. | |
| 2004/0202936 A1 | 10/2004 | Mikhaylik | |
| 2005/0147886 A1 | 7/2005 | Mikhaylik | |
| 2005/0147891 A1 | 7/2005 | Mikhaylik | |
| 2005/0175904 A1 | 8/2005 | Gorkovenko | |
| 2008/0187840 A1* | 8/2008 | Mikhaylik | H01M 4/38 |
| | | | 429/326 |
| 2010/0129699 A1 | 5/2010 | Mikhaylik et al. | |
| 2011/0101924 A1 | 5/2011 | Oh et al. | |
| 2011/0117407 A1 | 5/2011 | Huang | |
| 2012/0244425 A1* | 9/2012 | Tokuda | H01M 4/5825 |
| | | | 429/199 |
| 2013/0273435 A1 | 10/2013 | Leitner et al. | |
| 2014/0106239 A1 | 4/2014 | Barchasz et al. | |
| 2015/0072247 A1* | 3/2015 | Cho | H01M 10/0525 |
| | | | 429/331 |
| 2015/0188194 A1* | 7/2015 | Mikhaylik | H01M 2/14 |
| | | | 29/825 |
| 2015/0318575 A1* | 11/2015 | Choi | H01M 10/052 |
| | | | 429/156 |

FOREIGN PATENT DOCUMENTS

| | | |
|---|---|---|
| CN | 1930725 A | 3/2007 |
| CN | 102055019 A | 5/2011 |
| CN | 104300173 A | 1/2015 |
| EP | 3 333 963 A1 | 6/2018 |
| EP | 3 340 361 A1 | 6/2018 |
| JP | 8-287949 A | 11/1996 |
| JP | 2004-103560 A | 4/2004 |
| JP | 2014-523083 A | 9/2014 |
| KR | 2003-0022454 A | 3/2003 |
| KR | 10-0467456 B1 | 1/2005 |
| KR | 10-2005-0038897 A | 4/2005 |
| KR | 10-0570605 B1 | 4/2006 |
| KR | 10-2007-0027512 A | 3/2007 |
| KR | 10-2009-0086575 A | 8/2009 |
| KR | 10-2011-0042085 A | 4/2011 |
| KR | 10-1167334 B1 | 7/2012 |
| KR | 10-2014-0139135 A | 12/2014 |
| KR | 10-2015-0118074 A | 10/2015 |
| KR | 10-2016-0042525 A | 4/2016 |
| KR | 10-2017-0092455 A | 8/2017 |
| KR | 10-2017-0103630 A | 9/2017 |
| KR | 10-2018-0001997 A | 1/2018 |

OTHER PUBLICATIONS

International Search Report for PCT/KR2017/001582 (PCT/ISA/210) dated Apr. 18, 2017.

Jozwiuk et al., "The critical role of lithium nitrate in the gas evolution of lithium-sulfur batteries", Energy & Environmental Science, Issue 8, 2016, total of 10 pages.

* cited by examiner

ELECTROLYTE FOR LITHIUM-SULFUR BATTERY AND LITHIUM-SULFUR BATTERY COMPRISING SAME

This application claims priority to and the benefits of Korean Patent Application No. 10-2016-0080630, filed with Korean Intellectual Property Office on Jun. 28, 2016, and Korean Patent Application No. 10-2017-0019514, filed with Korean Intellectual Property Office on Feb. 13, 2017, the entire contents of which are incorporated herein by reference.

TECHNICAL FIELD

The present invention relates to a ternary liquid electrolyte for a lithium-sulfur battery and a lithium-sulfur battery including the same.

BACKGROUND ART

With recent development of portable electronic devices, electric vehicles and large capacity power storage systems, demands for large capacity batteries have arisen. A lithium-sulfur battery is a secondary battery using a sulfur series material having sulfur-sulfur bonds (S—S bonds) as a positive electrode active material and using lithium metal as a negative electrode active material, and sulfur, a main material of a positive electrode active material, has advantages of being very abundant in resources, having no toxicity and having a low atomic weight.

In addition, a lithium-sulfur battery has theoretical discharge capacity of 1672 mAh/g-sulfur and theoretical energy density of 2,600 Wh/kg, which is very high compared with theoretical energy density of other battery systems currently studied (Ni-MH battery: 450 Wh/kg, Li—FeS battery: 480 Wh/kg, Li—MnO$_2$ battery: 1,000 Wh/kg, Na—S battery: 800 Wh/kg), and therefore, has received attention as a battery having a high energy density property.

However, a lithium-sulfur battery has not been commercialized so far. This is due to the fact that, when using sulfur as an active material, the percentage of the sulfur used in an electrochemical reaction (sulfur utilization rate) is low and sufficient capacity as theoretical capacity is not secured. In order to overcome such a problem, positive electrode materials having increased sulfur impregnation, liquid electrolytes capable of increasing a sulfur utilization rate, and the like have been developed.

As a liquid electrolyte solvent of a lithium-sulfur battery, 1,3-dioxolane (DOL) and 1,2-dimethoxyethane (DME) having an excellent sulfur utilization rate have currently been used most often. These are used either alone or as a mixture, and Korean Patent Application Laid-Open Publication No. 10-2009-0086575 discloses a lithium-sulfur battery having 1,3-dioxolane in a negative electrode and 1,2-dimethoxyethane in a positive electrode in separation so as to be present non-uniformly using a polymer.

However, the solvent has a disadvantage of being readily decomposed during battery driving. When the solvent is decomposed, gas such as hydrogen, methane and ethene is generated producing a swelling phenomenon, and as a result, battery life-shortening is caused.

Accordingly, in order to obtain a stable life time property in a lithium-sulfur battery, development of stable liquid electrolytes that do not cause decomposition during battery driving has been required.

PRIOR ART DOCUMENTS

Korean Patent Application Laid-Open Publication No. 10-2009-0086575, Separation of Electrolyte

DISCLOSURE

Technical Problem

In view of the above, the inventors of the present invention have studied a liquid electrolyte solvent composition of a lithium-sulfur battery, and as a result, have completed the present invention.

Accordingly, an aspect of the present invention provides a liquid electrolyte for a lithium-sulfur battery having excellent stability.

Another aspect of the present invention provides a lithium-sulfur battery including the liquid electrolyte.

Technical Solution

According to an aspect of the present invention, there is provided a liquid electrolyte for a lithium-sulfur battery comprising:

a lithium salt; and
a non-aqueous solvent,
wherein the non-aqueous solvent includes
i) cyclic ether including one oxygen in a ring structure;
ii) glycol ether represented by the following Chemical Formula 1; and
iii) linear ether represented by the following Chemical Formula 2:

R$^1$—O—(CH$_2$CH$_2$O)$_x$—R$^2$      [Chemical Formula 1]

R$^3$—O—(CH$_2$CH$_2$O)$_y$—R$^4$      [Chemical Formula 2]

(In Chemical Formulae 1 and 2, R$^1$ to R$^4$, x and y are the same as described in the specification.)

Herein, the cyclic ether may be 5-membered to 7-membered cyclic ether unsubstituted or substituted with a C1 to C4 alkyl group or alkoxy group.

Herein, the cyclic ether may be tetrahydrofuran or tetrahydropyran unsubstituted or substituted with a C1 to C4 alkyl group or alkoxy group.

Herein, the cyclic ether may be one type selected from the group consisting of tetrahydrofuran, 2-methyltetrahydrofuran, 3-methyltetrahydrofuran, 2,3-dimethyltetrahydrofuran, 2,4-dimethyltetrahydrofuran, 2,5-dimethyltetrahydrofuran, 2-methoxytetrahydrofuran, 3-methoxytetrahydrofuran, 2,5-dimethoxytetrahydrofuran, 2-ethoxytetrahydrofuran, 3-ethoxytetrahydrofuran, tetrahydropyran, 2-methyltetrahydropyran, 3-methyltetrahydropyran and 4-methyltetrahydropyran.

Herein, the glycol ether may be one type selected from the group consisting of 1,2-dimethoxyethane, ethylene glycol ethylmethyl ether, diethylene glycol dimethyl ether, triethylene glycol dimethyl ether and tetraethylene glycol dimethyl ether.

Herein, the linear ether may be one type selected from the group consisting of ethylene glycol ethylmethyl ether, ethylene glycol diethyl ether, dipropyl ether, diisopropyl ether, dibutyl ether and diisobutyl ether.

Herein, the cyclic ether may be included in 10% by volume to 50% by volume of a total weight of the non-aqueous solvent.

Herein, the glycol ether and the linear ether may be included in a volume ratio of 1:3 to 3:1.

Herein, the lithium salt may be one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof.

Herein, the lithium salt may be included in a concentration of 0.1 M to 4.0 M.

Herein, the liquid electrolyte may further include an additive having N—O bonds in a molecule.

Herein, the additive may be one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide and tetramethylpiperidinyloxyl.

Herein, the additive may be included in 0.01% by weight to 10% by weight with respect to 100% by weight of the liquid electrolyte.

According to another aspect of the present invention, there is provided a lithium-sulfur battery including the liquid electrolyte.

Advantageous Effects

A liquid electrolyte according to an aspect of the present invention exhibits an excellent sulfur utilization rate when used in a lithium-sulfur battery, and exhibits excellent stability. Accordingly, the liquid electrolyte for a lithium-sulfur battery according to the present invention is capable of enhancing a life time property while securing a capacity property of a lithium-sulfur battery.

BEST MODE

Hereinafter, the present invention will be described in detail so that those skilled in the art may readily implement the present invention. However, the present invention may be implemented in various different forms, and is not limited to the examples described herein.

Liquid Electrolyte for Lithium-Sulfur Battery

A solvent currently used most often as a liquid electrolyte solvent of a lithium-sulfur battery is a mixed solvent of 1,3-dioxolane (DOL) and 1,2-dimethoxyethane (DME). Using a mixed solvent of DOL and DME enhances a sulfur utilization rate, and excellent results are obtained in terms of battery capacity.

However, using the combination in large batteries having high energy density has a problem in that a life time property significantly declines. As a result of experiments of the inventors of the present invention, it has been identified that, in a large capacity battery using a mixed solvent of DOL and DME, a capacity retention rate decreases at a very high rate. In addition, the battery produces a considerable amount of gas while the solvent is decomposed during driving. Such a solvent decomposition phenomenon causes liquid electrolyte depletion, and causes battery deformation such as battery swelling and electrode deintercalation, and resultantly becomes a factor of battery life-shortening.

A liquid electrolyte according to the present invention includes cyclic ether, glycol ether and linear ether, and exhibits excellent solvent stability compared with existing liquid electrolytes, and exhibits an enhanced life time property.

Specifically, in order to improve a battery life-shortening caused by liquid electrolyte decomposition occurring when driving a lithium-sulfur battery, the present invention provides a liquid electrolyte for a lithium-sulfur battery including a lithium salt and a non-aqueous solvent, wherein the non-aqueous solvent includes i) cyclic ether including one oxygen in a ring structure;

ii) glycol ether represented by the following Chemical Formula 1; and iii) linear ether represented by the following Chemical Formula 2:

[Chemical Formula 1]

[Chemical Formula 2]

(In Chemical Formulae 1 and 2,

R$^1$ to R$^4$ are the same as or different from each other, and each independently a C1 to C6 alkyl group, a C6 to C12 aryl group, or a C7 to C13 arylalkyl group, x is an integer of 1 to 4, y is an integer of 0 to 4, and the ether of Chemical Formula 1 is different from the ether of Chemical Formula 2.)

The C1 to C6 alkyl group mentioned in the present specification is a linear or branched alkyl group, and examples thereof may include a methyl group, an ethyl group, a propyl group, an isopropyl group, a butyl group, an isobutyl group, a sec-butyl group, a t-butyl group, a pentyl group, a hexyl group or the like, but are not limited thereto.

Examples of the C6 to C12 aryl group mentioned in the present specification may include a phenyl group or a naphthyl group unsubstituted or substituted with a C1 to C6 alkyl group.

Examples of the C7 to C13 arylalkyl group may include a benzyl group, a phenylethyl group, a phenylpropyl group or a phenylbutyl group unsubstituted or substituted with a C1 to C6 alkyl group.

In Chemical Formula 1, R$^1$ and R$^2$ are the same as or different from each other, and may preferably be a methyl group, an ethyl group, a propyl group, an isopropyl group or a butyl group, and may more preferably be a methyl group, an ethyl group or a propyl group.

In Chemical Formula 2, R$^3$ and R$^4$ are the same as or different from each other, and may preferably be a methyl group, an ethyl group, a propyl group, an isopropyl group, a butyl group, an isobutyl group, a pentyl group, a hexyl group, a phenyl group or a benzyl group, and y may preferably be 0, 1 or 2.

The liquid electrolyte according to the present invention includes cyclic ether including one oxygen in the ring structure as a first solvent. The cyclic ether is 5-membered or higher cyclic ether unsubstituted or substituted with an alkyl group, and preferably 5-membered to 7-membered cyclic ether unsubstituted or substituted with a C1 to C4 alkyl group or alkoxy group and more preferably tetrahydrofuran or tetrahydropyran unsubstituted or substituted with a C1 to C4 alkyl group or alkoxy group.

Nonlimiting examples of the cyclic ether may include tetrahydrofuran, 2-methyltetrahydrofuran, 3-methyltetrahydrofuran, 2,3-dimethyltetrahydrofuran, 2,4-dimethyltetrahydrofuran, 2,5-dimethyltetrahydrofuran, 2-methoxytetrahydrofuran, 3-methoxytetrahydrofuran, 2,5-dimethoxytetrahydrofuran, 2-ethoxytetrahydrofuran, 3-ethoxytetrahydrofuran, tetrahydropyran, 2-methyltetrahydropyran, 3-methyltetrahydropyran, 4-methyltetrahydropyran and the like.

The cyclic ether has low viscosity and thereby has favorable ion mobility, and, due to its high reduction stability, also exhibits high stability even when driving a battery for a long period of time.

The first solvent is preferably included in greater than or equal to 10% by volume and less than 50% by volume with respect to the total weight of the non-aqueous solvent, and more preferably included in 10% by volume to 40% by volume. When the first solvent is included in greater than the above-mentioned range, liquid electrolyte stability decreases making it difficult to secure an effect of enhancing battery life.

The liquid electrolyte according to the present invention includes the glycol ether represented by Chemical Formula 1 as a second solvent.

Examples of the glycol ether may include 1,2-dimethoxyethane, ethylene glycol diethyl ether, ethylene glycol ethylmethyl ether, ethylene glycol dipropyl ether, ethylene glycol ethylmethyl ether, diethylene glycol dimethyl ether, diethylene glycol diethyl ether, triethylene glycol dimethyl ether, triethylene glycol diethyl ether, tetraethylene glycol dimethyl ether, tetraethylene glycol diethyl ether and the like, and preferably, may include 1,2-dimethoxyethane, ethylene glycol ethylmethyl ether, diethylene glycol dimethyl ether, triethylene glycol dimethyl ether and tetraethylene glycol dimethyl ether. Such glycol ether may increase a sulfur utilization rate due to excellent sulfur-based material solubility.

A third solvent of the liquid electrolyte according to the present invention is the linear ether represented by Chemical Formula 2, and the linear ether may be glycol ether, or ether including one oxygen in the molecule. However, when the third solvent is glycol ether, this is a compound different from the second solvent.

Nonlimiting examples of the ether including one oxygen in the molecular structure may include dimethyl ether, diethyl ether, dipropyl ether, diisopropyl ether, dibutyl ether, dipentylether, dihexyl ether, ethylmethyl ether, methylpropyl ether, butylmethyl ether, ethylpropyl ether, butylpropyl ether, phenylmethyl ether, diphenylether, dibenzyl ether and the like.

The third solvent may preferably include ethylene glycol ethylmethyl ether, ethylene glycol diethyl ether, dipropyl ether, diisopropyl ether, dibutyl ether, or diisobutyl ether. Such linear ether exhibits an effect of suppressing polysulfide dissolution and solvent decomposition, and thereby contributes to liquid electrolyte stability.

The 1,2-dimethoxyethane, the diethylene glycol dimethyl ether, the triethylene glycol dimethyl ether, the tetraethylene glycol dimethyl ether and the like have excellent sulfur-based material solubility and increases a sulfur utilization rate, and therefore, contributes to enhancing a battery capacity property. Meanwhile, the ethylene glycol ethylmethyl ether, the ethylene glycol diethyl ether, the dipropyl ether, the diisopropyl ether, the dibutyl ether, the diisobutyl ether and the like have excellent stability, and decomposition hardly occurs during battery driving. Accordingly, proper mixing of these solvents has an advantage of securing both a sulfur utilization rate and liquid electrolyte stability.

The second solvent and the third solvent are preferably included in 50% by volume or greater with respect to the total weight of the non-aqueous solvent. Herein, the relative ratio of the second solvent and the third solvent may be properly adjusted depending on the types of electrodes used, battery capacity and the like, however, each is preferably included in at least 10% by volume or greater with respect to the total weight of the non-aqueous solvent in terms of securing battery capacity and stability. Specifically, the second solvent and the third solvent are preferably mixed in a volume ratio of 1:3 to 3:1, and more preferably mixed in a volume ratio of 1:2 to 2:1.

According to one preferred embodiment of the liquid electrolyte for a lithium-sulfur battery of the present invention, the non-aqueous solvent of the liquid electrolyte includes tetrahydrofuran as the first solvent, 1,2-dimethoxyethane as the second solvent, and ethylene glycol ethylmethyl ether or dipropyl ether as the third solvent, and a volume ratio thereof may be from 1:1:1 to 1:2:2. This may increase a sulfur utilization rate of a lithium-sulfur battery, and therefore, may enhance battery life while securing a battery capacity property. Accordingly, it is advantageous for batteries including high capacity and high loading electrodes.

Another preferred embodiment includes tetrahydrofuran as the first solvent, ethylene glycol ethylmethyl ether as the second solvent, and ethylene glycol diethyl ether, dipropyl ether or diisobutyl ether as the third solvent, and a volume ratio thereof may be from 1:1:1 to 1:2:2. This may greatly enhance liquid electrolyte stability and thereby significantly improve battery life. Accordingly, the liquid electrolyte may be suitably used in batteries operated at high temperatures requiring high liquid electrolyte stability.

As described above, the liquid electrolyte of the present invention may be prepared to accord with various characteristics required for a battery by properly selecting a solvent combination.

The liquid electrolyte for a lithium-sulfur battery of the present invention includes a lithium salt added to an electrolyte for increasing ion conductivity. The lithium salt is not particularly limited in the present invention, and those that may be commonly used in lithium secondary batteries may be used without limit. Specifically, the lithium salt may be one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof, and preferably, (CF$_3$SO$_2$)$_2$NLi, (C$_2$F$_5$SO$_2$)$_2$NLi, (SO$_2$F)$_2$NLi and the like may be used.

The concentration of the lithium salt may be determined considering ion conductivity and the like, and may preferably be from 0.1 M to 4.0 M, or 0.5 M to 2.0 M. When the lithium salt concentration is less than the above-mentioned range, ion conductivity appropriate for battery driving is difficult to secure, and when the concentration is greater than above-mentioned range, viscosity of the liquid electrolyte increases decreasing lithium ion mobility, and battery performance may decline due to an increase in the decomposition reaction of the lithium salt itself, and therefore, the concentration is properly controlled within the above-mentioned range.

The non-aqueous liquid electrolyte for a lithium-sulfur battery of the present invention may further include an additive having N—O bonds in the molecule. The additive is effective in forming a stable film in a lithium electrode and greatly enhancing charge and discharge efficiency. Such an additive may be a nitrate or nitrite-based compound, a nitro compound and the like. As one example, one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitro pyridine, dinitropyridine, nitrotoluene, dinitrotoluene, pyridine N-oxide, alkylpyridine N-oxide, and tetramethylpiperidinyloxyl may be used. According to one example of the present invention, lithium nitrate ($LiNO_3$) may be used.

The additive is used in a range of 0.01% by weight to 10% by weight and preferably 0.1% by weight to 5% by weight with respect to 100% by weight of the whole liquid electrolyte composition. When the content is less than the above-mentioned range, the above-mentioned effects may not be secured, and when the content is greater than the above-mentioned range, resistance may increase due to the film, and therefore, the content is properly controlled within the above-mentioned range.

As described above, the liquid electrolyte for a lithium-sulfur battery according to the present invention uses a mixed solvent of cyclic ether and linear ether as the solvent for securing liquid electrolyte stability, and accordingly, gas generation in a battery may be suppressed during charge and discharge of the battery, and a swelling phenomenon may be improved.

A method for preparing the liquid electrolyte according to the present invention is not particularly limited in the present invention, and common methods known in the art may be used.

Lithium-Sulfur Battery

A lithium-sulfur battery according to the present invention includes a positive electrode, a negative electrode, a separator provided therebetween, and a liquid electrolyte, and as the liquid electrolyte, the liquid electrolyte for a lithium-sulfur battery according to the present invention is used.

The lithium-sulfur battery according to the present invention has improved liquid electrolyte stability and thereby exhibits an excellent life time property.

The constitution of the positive electrode, the negative electrode and the separator of the lithium-sulfur battery is not particularly limited in the present invention, and may follow constitutions known in the art.

Positive Electrode

The positive electrode according to the present invention includes a positive electrode active material formed on a positive electrode current collector.

As the positive electrode current collector, those capable of being used as a current collector in the art may all be used, and specifically, foamed aluminum, foamed nickel or the like having excellent conductivity may be preferably used.

The positive electrode active material may include elemental sulfur ($S_8$), sulfur series compounds or mixtures thereof. The sulfur series compound may specifically be $Li_2S_n(n\geq1)$, an organosulfur compound, a carbon-sulfur polymer ($(C_2S_x)_n$: x=2.5 to 50, n≥2) or the like. These may be used as a composite with a conductor since sulfur materials alone do not have electrical conductivity.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The positive electrode may further include a binder for binding of the positive electrode active material and the conductor and for binding on the current collector. The binder may include a thermoplastic resin or a thermosetting resin. For example, polyethylene, polyethylene oxide, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, water, isopropyl alcohol and the like may be included.

Negative Electrode

The negative electrode according to the present invention includes a negative electrode active material formed on a negative electrode current collector.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which the surface is treated with a conductor, conductive polymers or the like may also be used.

As the negative electrode active material, a material capable of reversibly intercalating or deintercalating lithium ions ($Li^+$), a material capable of reversibly forming a lithium-containing compound by reacting with lithium ions, lithium metal or a lithium alloy may be used. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further include a binder for binding of the negative electrode active material and the conductor and for binding on the current collector, and specifically, the binder is the same as the binder of the positive electrode described above.

Separator

A common separator may be provided between the positive electrode and the negative electrode. The separator is a physical separator having a function of physically separating electrodes, and those commonly used as a separator may be used without particular limit, and particularly, those having an excellent electrolyte moisture retention ability while having low resistance for ion migration of the liquid electrolyte are preferred.

In addition, the separator enables lithium ion to transfer between the positive electrode and the negative electrode while separating or insulating the positive electrode and the negative electrode from each other. Such a separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The positive electrode, the negative electrode and the separator included in the lithium-sulfur battery may each be prepared using common components and preparation methods, and although not particularly limited thereto, appearances of the lithium-sulfur battery may include a cylinder-type using a can, a square-type, a pouch-type, a coin-type, and the like.

Hereinafter, preferred examples are provided in order to illuminate the present invention, however, the following examples are for illustrative purposes only, and it is obvious to those skilled in the art that various changes and modifications may be made within the scope and technological ideas of the present invention, and such changes and modifications also belong to the attached claims.

EXAMPLE

Examples 1 and 2 and Comparative Examples 1 and 2

(1) Preparation of Liquid Electrolyte

Non-aqueous liquid electrolytes of Examples 1 and 2 and Comparative Examples 1 and 2 were prepared by adding LiTFSI (($CF_3SO_2$)$_2$NLi) in a concentration of 1.0 M to a mixed solvent having a composition of the following Table 1, and adding 1% by weight of $LiNO_3$ thereto based on 100% by weight of the liquid electrolyte. Solvents used herein are as follows.

THF: Tetrahydrofuran
DOL: 1,3-Dioxolane
DME: 1,2-Dimethoxyethane
EGEME: Ethylene glycol ethylmethyl ether
DPE: Dipropyl ether

TABLE 1

| | Solvent (Volume Ratio) | Lithium Salt | Additive |
|---|---|---|---|
| Example 1 | THF:DME:EGEME (1:1:1) | 1.0M LiTFSI | 1 wt % $LiNO_3$ |
| Example 2 | THF:DME:DPE (1:1:1) | 1.0M LiTFSI | 1 wt % $LiNO_3$ |
| Comparative Example 1 | DOL:DME (1:1) | 1.0M LiTFSI | 1 wt % $LiNO_3$ |
| Comparative Example 2 | THF:DME (1:1) | 1.0M LiTFSI | 1 wt % $LiNO_3$ |

(2) Manufacture of Lithium-Sulfur Battery

65% by weight of sulfur, 25% by weight of carbon black, and 10% by weight of polyethylene oxide were mixed with acetonitrile to prepare positive electrode active material slurry. The positive electrode active material slurry was coated on an aluminum current collector, and the result was dried to prepare a positive electrode having a size of 30×50 mm$^2$ and a loading amount of 5 mAh/cm$^2$. In addition, lithium metal having a thickness of 150 μm was employed as a negative electrode.

The prepared positive electrode and the negative electrode were placed to face each other, and a polyethylene separator having a thickness of 20 μm was provided therebetween, and the result was filled with the liquid electrolyte prepared in each of the examples and comparative examples.

Experimental Example 1: Battery Performance Evaluation

Figure 1:
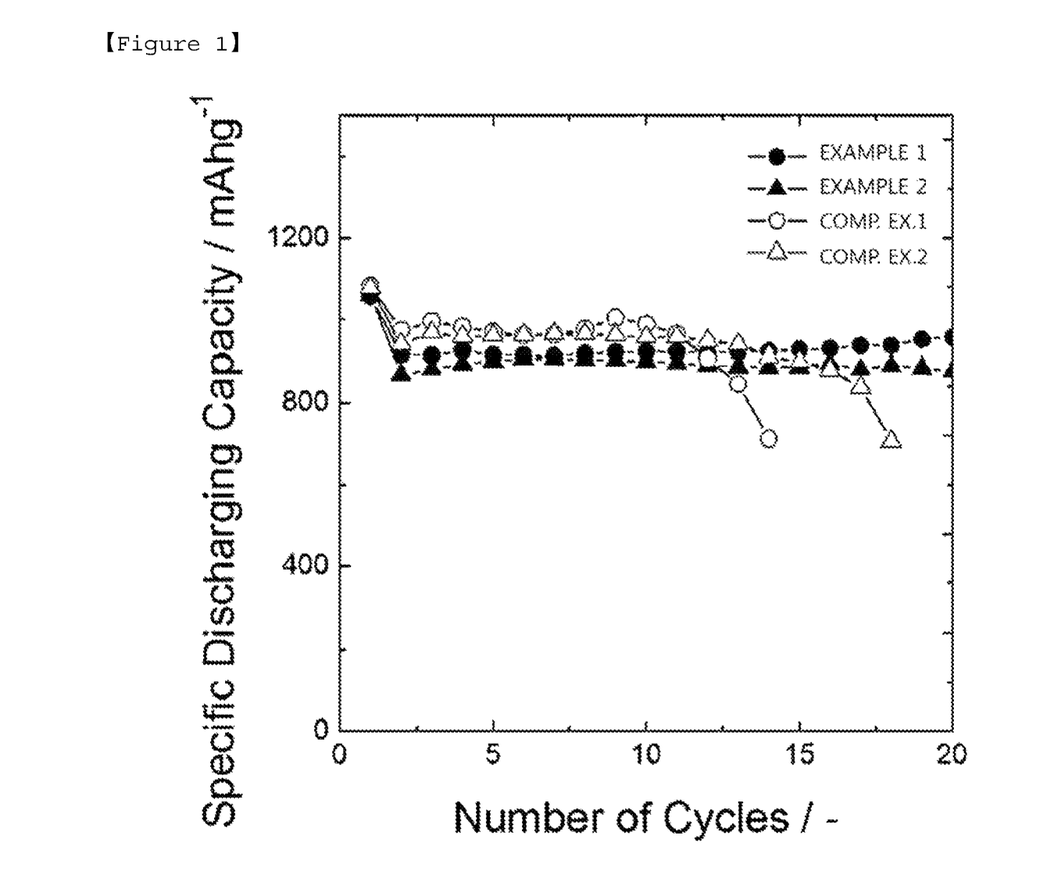
FIG. 1 is a graph showing specific discharge capacity of batteries of Examples 1 and 2 and Comparative Examples 1 and 2.

For each of the lithium-sulfur batteries of Examples 1 and 2 and Comparative Examples 1 and 2, specific discharge capacity was measured while progressing 20 cycles under the following condition, and the results are shown in FIG. 1.

Charge: Rate 0.1 C, voltage 2.8 V, CC/CV (5% current cut at 0.1 C)

Discharge: Rate 0.1 C, voltage 1.5 V, CC

As shown in FIG. 1, it was identified that discharge capacity started to decrease after 10 cycles in the batteries of Comparative Examples 1 and 2. However, discharge capacity was stably maintained up to 20 cycles in the batteries of Examples 1 and 2. In addition, a swelling phenomenon was observed in the batteries of Comparative Examples 1 and 2 due to gas generated with the battery driving, however, a swelling phenomenon was not observed in the batteries of Examples 1 and 2.

Examples 3 to 6 and Comparative Example 3

(1) Preparation of Liquid Electrolyte

Non-aqueous liquid electrolytes of Examples 3 to 6 and Comparative Example 3 were prepared by adding LiTFSI (($CF_3SO_2$)$_2$NLi) in a concentration of 1.0 M to a mixed solvent having a composition of the following Table 2, and adding 1% by weight of $LiNO_3$ thereto based on 100% by weight of the liquid electrolyte. Solvents used herein are as follows.

THF: Tetrahydrofuran
DOL: 1,3-Dioxolane
DME: 1,2-Dimethoxyethane
EGEME: Ethylene glycol ethylmethyl ether
EGDEE: Ethylene glycol diethyl ether DPE: Dipropyl ether DIBE: Diisobutyl ether

TABLE 2

|  | Solvent (Volume Ratio) | Lithium Salt | Additive |
|---|---|---|---|
| Example 3 | THF:EGEME:EGDEE (1:1:1) | 1.0M LiTFSI | 1 wt % LiNO$_3$ |
| Example 4 | THF:EGEME:DPE (1:1:1) | 1.0M LiTFSI | 1 wt % LiNO$_3$ |
| Example 5 | THF:EGEME:DIBE (1:1:1) | 1.0M LiTFSI | 1 wt % LiNO$_3$ |
| Example 6 | THF:EGEME:DPE (2:1:1) | 1.0M LiTFSI | 1 wt % LiNO$_3$ |
| Comparative Example 3 | DOL:DME (1:1) | 1.0M LiTFSI | 1 wt % LiNO$_3$ |

(2) Manufacture of Lithium-Sulfur Battery

60% by weight of sulfur, 30% by weight of carbon black, and 10% by weight of polyethylene oxide were mixed with acetonitrile to prepare positive electrode active material slurry. The positive electrode active material slurry was coated on an aluminum current collector, and the result was dried to prepare a positive electrode having a size of 30×50 mm$^2$ and a loading amount of 5 mAh/cm$^2$. In addition, lithium metal having a thickness of 150 μm was employed as a negative electrode.

The prepared positive electrode and the negative electrode were placed to face each other, and a polyethylene separator having a thickness of 20 μm was provided therebetween, and the result was filled with the liquid electrolyte prepared in each of the examples and comparative example.

Experimental Example 2: Battery Performance Evaluation

Figure 2:
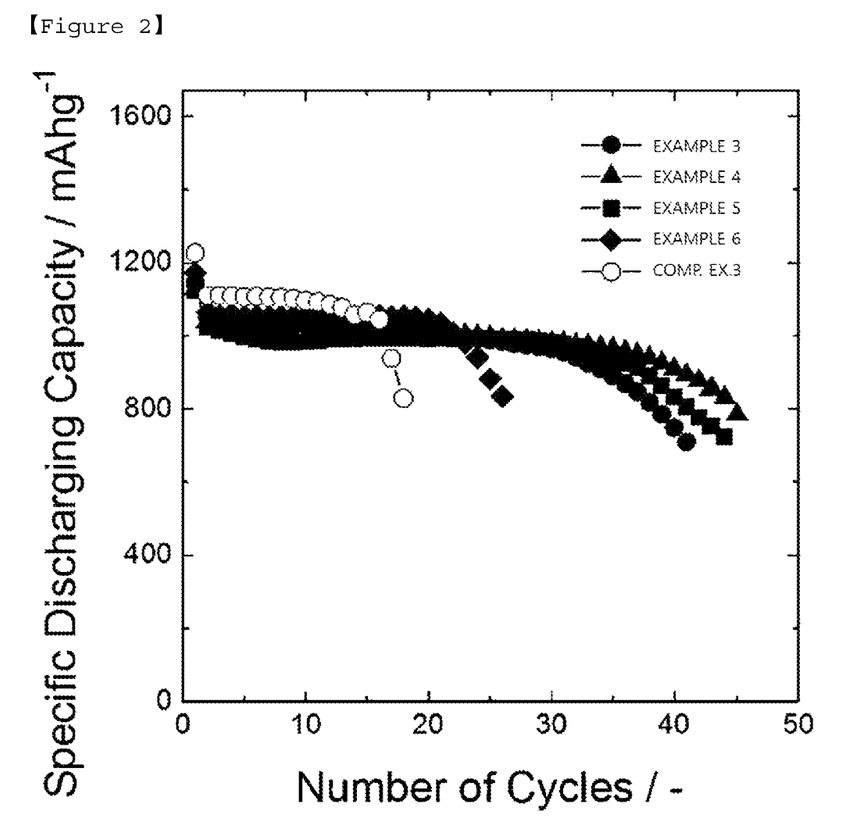
FIG. 2 is a graph showing specific discharge capacity of batteries of Examples 3 to 6 and Comparative Example 3.

For each of the lithium-sulfur batteries of Examples 3 to 6 and Comparative Example 3, specific discharge capacity was measured while repeating charge and discharge under the following condition, and the results are shown in FIG. 2.

Charge: Rate 0.1 C, voltage 2.8 V, CC/CV (5% current cut at 0.1 C)

Discharge: Rate 0.1 C, voltage 1.5 V, CC

As shown in FIG. 2, it was seen that high initial charge and discharge capacity was maintained while repeating cycles dozens of times in the lithium-sulfur batteries using the liquid electrolyte of the present invention. Meanwhile, it was identified that a battery life enhancing effect was somewhat low in the battery of Example 6 in which cyclic ether occupies 50% of the total solvent volume compared to the batteries of other examples.

In comparison, the battery of Comparative Example 3 had a tendency of initial capacity being greatly reduced after approximately 15 times of charge and discharge. Such a result is considered to be due to liquid electrolyte decomposition occurring during battery driving caused by low stability of the solvent itself.

From the above-mentioned results, it was seen that the liquid electrolyte composition of ternary combination of the present invention enhanced initial charge and discharge capacity retention rate of a battery, and also enhanced battery life when compared with liquid electrolytes of existing combinations. In addition, it was seen that the liquid electrolyte of the present invention had a more superior battery life enhancing effect when a cyclic ether content was less than 50% of the total solvent volume.

The invention claimed is:

1. A lithium-sulfur battery comprising a liquid electrolyte, said liquid electrolyte comprising:
   a lithium salt; and
   a non-aqueous solvent,
   wherein the non-aqueous solvent includes consists of a mixture of three solvents:
   i) a cyclic ether selected from the group consisting of tetrahydrofuran, 2-methyltetrahydrofuran, 3-methyltetrahydrofuran, 2,3-dimethyltetrahydrofuran, 2,4-dimethyltetrahydrofuran, 2,5-dimethyltetrahydrofuran, 2-methoxytetrahydrofuran, 3-methoxytetrahydrofuran, 2,5-dimethoxytetrahydrofuran, 2-ethoxytetrahydrofuran, 3-ethoxytetrahydrofuran, tetrahydropyran, 2-methyltetrahydropyran, 3-methyltetrahydropyran, and 4-methyltetrahydropyran;
   ii) a glycol ether selected from the group consisting of 1,2-dimethoxyethane, ethylene glycol diethyl ether, ethylene glycol ethylmethyl ether, ethylene glycol dipropyl ether, ethylene glycol ethylmethyl ether, diethylene glycol dimethyl ether, diethylene glycol diethyl ether, triethylene glycol dimethyl ether, triethylene glycol diethyl ether, tetraethylene glycol dimethyl ether, and tetraethylene glycol diethyl ether; and
   iii) a linear ether selected from the group consisting of dimethyl ether, diethyl ether, dipropyl ether, diisopropyl ether, dibutyl ether, dipentylether, dihexyl ether, ethylmethyl ether, methylpropyl ether, butylmethyl ether, ethylpropyl ether, butylpropyl ether, phenylmethyl ether, diphenylether, dibenzyl ether, ethylene glycol ethylmethyl ether, ethylene glycol diethyl ether, dipropyl ether, diisopropyl ether, dibutyl ether, and diisobutyl ether,
   wherein the glycol ether is different from the linear ether,
   wherein the cyclic ether is present in an amount less than 50% by volume of the non-aqueous solvent;
   and wherein the electrolyte does not comprise any additional solvents.

2. The lithium-sulfur battery of claim 1, wherein the cyclic ether is present in an amount of 10% by volume to 40% by volume of the non-aqueous solvent.

3. The lithium-sulfur battery of claim 1, wherein the cyclic ether is tetrahydropyran.

4. The lithium-sulfur battery of claim 1, wherein the glycol ether is one type selected from the group consisting of 1,2-dimethoxyethane, ethylene glycol ethylmethyl ether, diethylene glycol dimethyl ether, triethylene glycol dimethyl ether and tetraethylene glycol dimethyl ether.

5. The lithium-sulfur battery of claim 1, wherein the linear ether is one type selected from the group consisting of ethylene glycol ethylmethyl ether, ethylene glycol diethyl ether, dipropyl ether, diisopropyl ether, dibutyl ether and diisobutyl ether.

6. The lithium-sulfur battery of claim 1, wherein the cyclic ether is included in 10% by volume to less than 50% by volume of a total weight of the non-aqueous solvent.

7. The lithium-sulfur battery of claim 1, wherein the glycol ether and the linear ether are included in a volume ratio of 1:3 to 3:1.

8. The lithium-sulfur battery of claim 1, wherein the lithium salt includes one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof.

9. The lithium-sulfur battery of claim 1, wherein the lithium salt is included in a concentration of 0.1 M to 4.0 M.

10. The lithium-sulfur battery of claim 1, further comprising an additive having N—O bonds in a molecule.

11. The lithium-sulfur battery of claim 10, wherein the additive is one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitro pyridine, dinitropyridine, nitrotoluene, dinitrotoluene, pyridine N-oxide, alkylpyridine N-oxide and tetramethylpiperidinyloxyl.

12. The lithium-sulfur battery of claim 10, wherein the additive is included in an amount of 0.01% by weight to 10% by weight with respect to 100% by weight of the liquid electrolyte.

13. The lithium-sulfur battery of claim 1, wherein the liquid electrolyte suppresses gas generation.

14. The lithium-sulfur battery of claim 1, wherein the volume ratio of the cyclic ether to the glycol ether to the linear ether is from 1:1:1 to 1:2:2.

15. The lithium-sulfur battery of claim 1, wherein the non-aqueous solvent of the liquid electrolyte includes tetrahydrofuran as the cyclic ether, 1,2-dimethoxyethane as the glycol ether, and ethylene glycol ethylmethyl ether as the linear ether.

16. The lithium-sulfur battery of claim 1, wherein the non-aqueous solvent of the liquid electrolyte includes tetrahydrofuran as the cyclic ether, 1,2-dimethoxyethane as the glycol ether, and dipropyl ether as the linear ether.

17. The lithium-sulfur battery of claim 1, wherein the non-aqueous solvent of the liquid electrolyte includes tetrahydrofuran as the cyclic ether, ethylene glycol ethylmethyl ether as the glycol ether, and ethylene glycol diethyl ether as the linear ether.

18. The lithium-sulfur battery of claim 1, wherein the non-aqueous solvent of the liquid electrolyte includes tetrahydrofuran as the cyclic ether, ethylene glycol ethylmethyl ether as the glycol ether, and dipropyl ether as the linear ether.

19. The lithium-sulfur battery of claim 1, wherein the non-aqueous solvent of the liquid electrolyte includes tetrahydrofuran as the cyclic ether, ethylene glycol ethylmethyl ether as the glycol ether, and diisobutyl ether as the linear ether.

* * * * *